J. W. BOYD.
FIELD AND ROAD DRAG.
APPLICATION FILED JUNE 15, 1917.
1,245,431.
Patented Nov. 6, 1917.
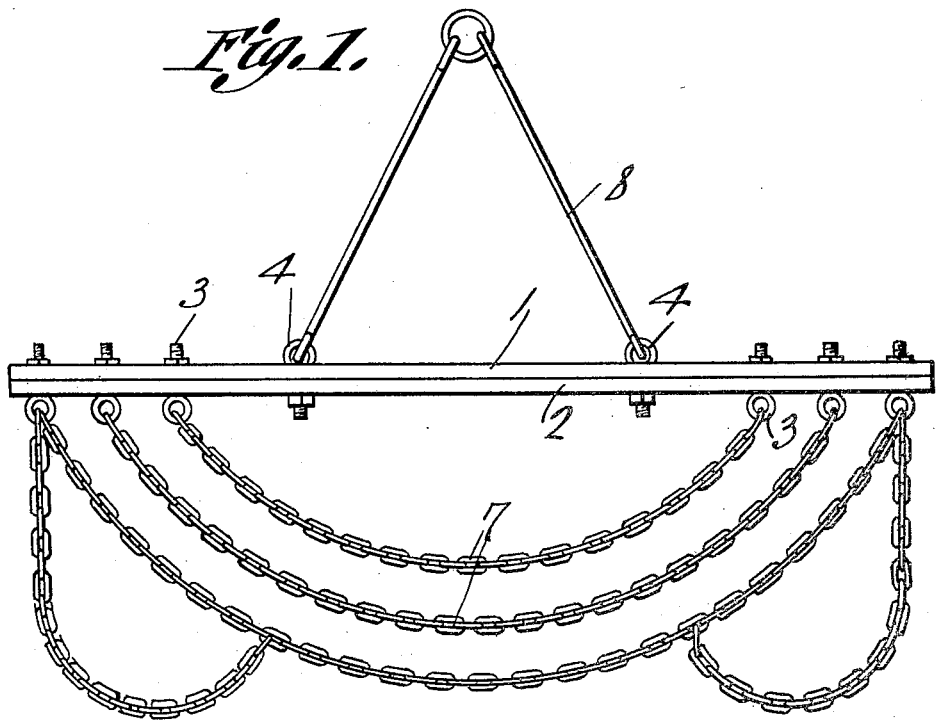
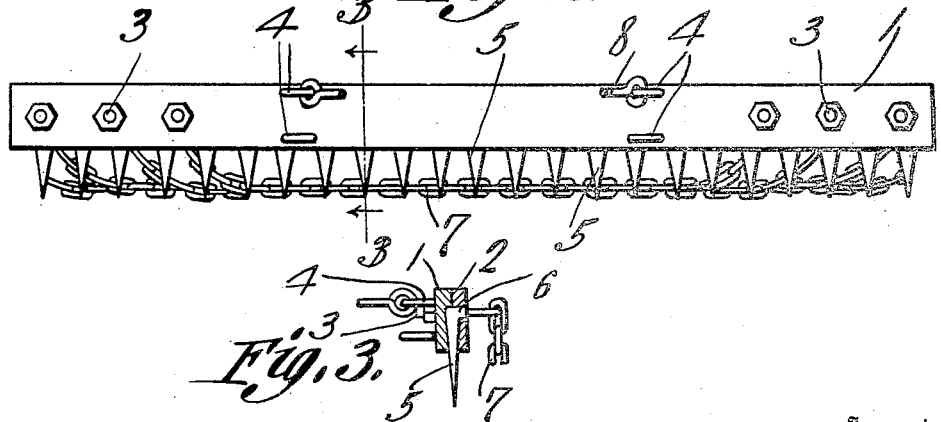

UNITED STATES PATENT OFFICE.

JOHN W. BOYD, OF ANNAWAN, ILLINOIS.

FIELD AND ROAD DRAG.

1,245,431.  Specification of Letters Patent.  Patented Nov. 6, 1917.

Application filed June 15, 1917. Serial No. 175,005.

*To all whom it may concern:*

Be it known that I, JOHN W. BOYD, a citizen of the United States, residing at Annawan, in the county of Henry and State of Illinois, have invented a new and useful Field and Road Drag, of which the following is a specification.

The subject of this invention is a drag such as is ordinarily used in leveling land, and the objects of the invention are first, to provide a drag which will automatically tilt when an obstruction is encountered, second, to provide a drag which may be adjusted to different angles, third, to provide a simple and efficient drag.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

A practical embodiment of the invention is shown in the accompanying drawing, wherein:

Figure 1 is a plan view of a drag constructed in accordance with my invention.

Fig. 2 is a part elevation.

Fig. 3 is a cross section on the line 3—3 of Fig. 2, the drag chains broken away.

Referring to the drawing by numerals of reference:

Two beams or bars 1 and 2 are secured together by eye bolts 3 and 4 or otherwise. Clamped between the bars 1 and 2 are teeth 5 which are formed with the angled upper ends 6 which extend into spaced apertures formed in the rear bar 2 for their reception. A series of chains 7 are attached to the eyebolts 3 and trail behind the drag bar when in use. Draft means, indicated at 8 may be secured to the upper or lower eye bolts 4, thus varying the angle at which the bar and its teeth stand.

In practice the bar is used in the ordinary way, the draft rigging 8 being secured to the eye bolts 4 and horses or other source of motive power secured to the draft rigging.

As will be apparent, if the draft rigging is connected to the upper eye bolts 4, the teeth will be inclined downwardly and rearwardly as the bar is drawn forward, while if secured to the lower eye bolts 4, the teeth will be inclined downwardly and forwardly. It is also evident that the teeth will be drawn rearwardly by any obstruction with which they meet and the device will thus pass over such obstruction.

Having thus described the invention, what is claimed as new and sought by Letters Patent, is:

A drag, comprising bars, one of the bars provided with spaced apertures, teeth formed with bent upper ends adapted to enter the apertures positioned between the bars, means for clamping the bars together, flexible drags secured to and extending rearwardly of the bar, and a draft rigging adjustably secured to the bars.

In testimony that I claim the foregoing as my own, I have hereto affixed my signature in the presence of two witnesses.

JOHN W. BOYD.

Witnesses:
R. C. MOON,
G. A. HOLZINGER.

Copies of this patent may be obtained for five cents each, by addressing the "Commissioner of Patents, Washington, D. C."